United States Patent Office.

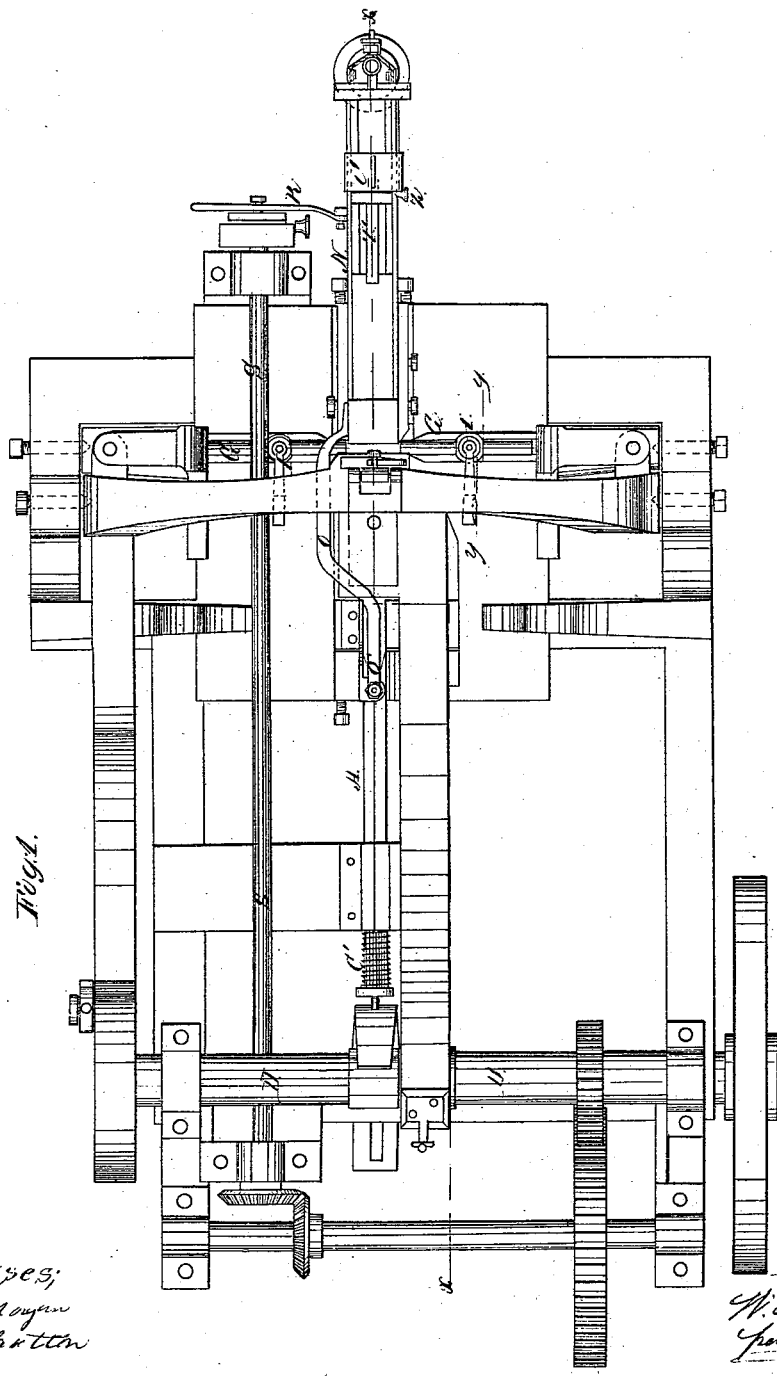

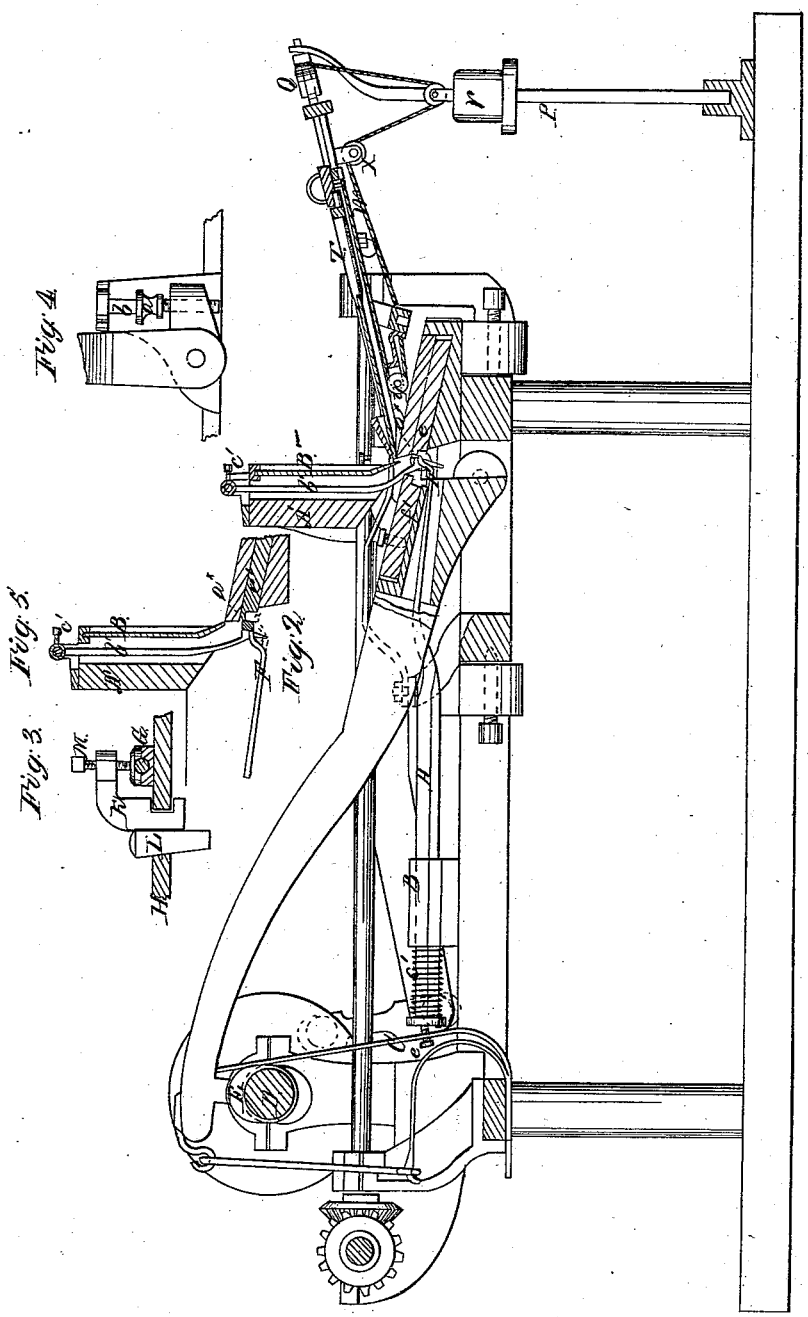

W. H. BATTELLE, OF YOUNGSTOWN, OHIO.

Letters Patent No. 82,679, dated October 6, 1868.

IMPROVEMENT IN NAIL-CUTTING MACHINES.

The Schedule referred to in these Letters Patent and making part of the same.

TO ALL WHOM IT MAY CONCERN:

Be it known that I, W. H. BATTELLE, of Youngstown, in the county of Mahoning, in the State of Ohio, have invented a new and useful Improvement in Nail-Machines; and I do hereby declare that the following is a full, clear, and exact description thereof, which will enable others skilled in the art to make and use the same, reference being had to the accompanying drawings, forming part of this specification, in which—

Figure 1 represents a plan view of a nail-cutting machine provided with my improvements.

Figure 2 represents a sectional elevation of the same, on the line $x\,x$ of fig. 1.

Figure 3 represents a section, on the line $y\,y$ of fig. 1; and

Figure 4 represents in detail a view of the method of communicating motion from the cutter-head to the headers.

Figure 5 is a sectional view, showing the operation of the cutting, nipping, and griping-devices.

Similar letters of reference indicate like parts.

The object of this invention is to provide an improved nail-cutting machine, the improvements being in the arrangement of the nipper, and the means of actuating it, the method of securing the heading-dies, and the arrangement of the feeding-apparatus of a machine, to form a head alternately on each side.

A represents the nipper-slide, arranged to reciprocate in the guiding and supporting-box B, and actuated in the direction to nip the blank, and to hold it by the spring C, to which motion is communicated by a tappet on the main shaft, and which is provided with a set-screw, E, for adjusting the position of the slide, and the pressure of the spring thereon. It is retracted by the spring C'.

The said slide terminates at the operating-end in the bifurcated spring-nipper F, which, by reason of this arrangement, is susceptible of the most accurate adjustment for nipping, turning, and holding the blank.

G represents the headers, which are arranged in semicircular grooves in the carriers H, and provided with the enlargements I, having a plain upper face.

K represents brackets, which are detachably connected to the carriers by the notched end passing through vertical mortises in the carriers, and being keyed therein by the keys E. The said brackets are provided with the set-screws M, for screwing down upon the face of the enlargements I of the headers.

This arrangement admits of a ready adjustment or removal of the headers, when required.

N represents the feeding-guide, supported by the arm O, passing behind the cutters, and pivoted on the studs O', and at the outer end by the support D.

Q represents a hinge-joint, in the stem of the said guide, to admit of the vibration of the guide, for the purpose of presenting the plate to the cutters at the proper angle. The said vibration is caused by a connecting-rod, R, from the crank-shaft S, connected to the said crank, so as to vary the amount of vibration.

T represents the nail-plate holding-rod, connected to the slide U.

The plate is fed up to the cutters by the weight V, suspended on the cords W, connected to the stem of the guide, near the outer end, and passing over the pulleys X and Y, and thence to the slide U.

Z represents a spring-catch for holding the slide U, when it is desired that it shall not be moved forward by the weight.

A' is the cutting-lever, hung upon centres $a'$, and operated from the shaft D, by an eccentric and connecting-rods, in the usual manner. In the face of the lever the knife B' is secured, and behind the knife a spring, $b'$, is pivoted, and allowed a slight forward and backward movement by the spring $c'$ and set-screw at its upper end. The lower end of the gauge is cut out to form a shoulder, which allows it to be thrown forward by the spring. $e'\,f'$ are the fixed and movable dies respectively.

The operation of cutting, nipping, and griping is as follows:

The knife B' is thrown down upon the nail-plate by the cutting-lever, carrying with it the gauge-spring $b'$. The blank, shown in blue, fig. 5, after being cut, is caught between the face of the gauge-spring and the die $e'$, and carried downward until its centre has passed the lower edge $a^{\times}$ of the die. While in this position, the spring-nipper F is moved forward against the side of the blank, below its centre, pushing it forward, and turning it one-fourth over, into the recess formed in the die $e'$. As the blank is turned, the nipper holds it in the position shown in red, fig. 5, until the die $f'$ comes forward and gripes it, holding it firmly for the action of the headers.

By the arrangement of the inner barring of the plate-holder beyond the cutters, the vibrating movement imparted to it, for the purpose of producing the taper, will also carry the plate toward and within reach of the header, so that the wide end of the blank will receive the blow to form the head, while the point will be carried away from the other header.

The same result may be accomplished by means of an eccentric and connecting-rod on the shaft S, near the lower end of the plate-holder, arranged to impart a vibratory movement to that end of the holder at the same time that the outer end is vibrated, but not to the same extent; but I prefer the plan which I have represented in the drawings.

Instead of the toggle-joints commonly used for actuating the header-carriers, I have adopted the adjustable screw-bolt $a$, having an enlarged and flat head, whereon the pin $b$ in the arm of the header-carrier may slide, under the vibrating action of the cutter-head and the said arm.

Having thus described my invention, I claim as new, and desire to secure by Letters Patent—

1. The arrangement of sliding nipper-bar A, provided with the spring-nipper F, the spring C, cam E, adjusting-pin $e$, and retractor C′, substantially as and for the purpose set forth.

2. The arrangement, with the feeding-guide N, of the slide U, rod T, weight V, pulleys X Y, rod P, and cord W, all substantially as and for the purpose set forth.

3. The arrangement, upon the carriers H, of the headers G, enlargements I, set-screws M, and detachable brackets K, substantially as described, for the purpose specified.

W. H. BATTELLE.

Witnesses:
A. P. THAYER,
ALEX. F. ROBERTS.